(No Model.)
H. B. SMITH.
Wind Wheel.
No. 232,558. Patented Sept. 21, 1880.
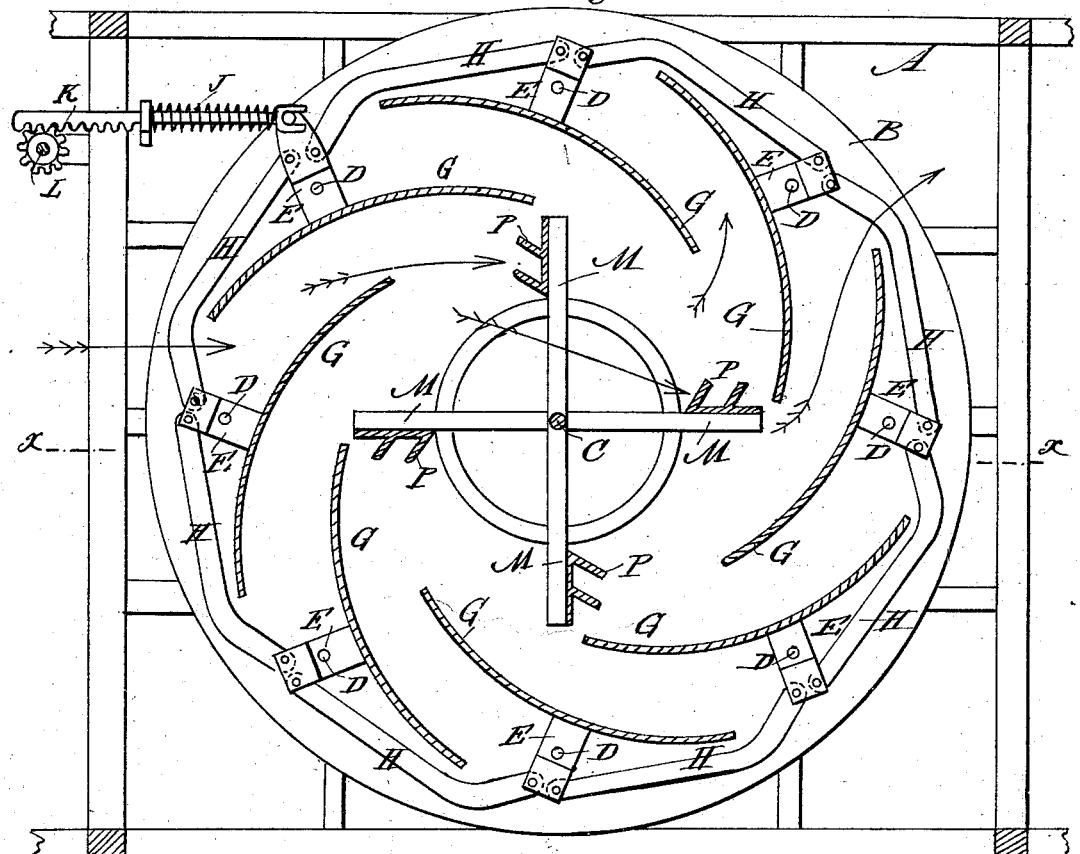
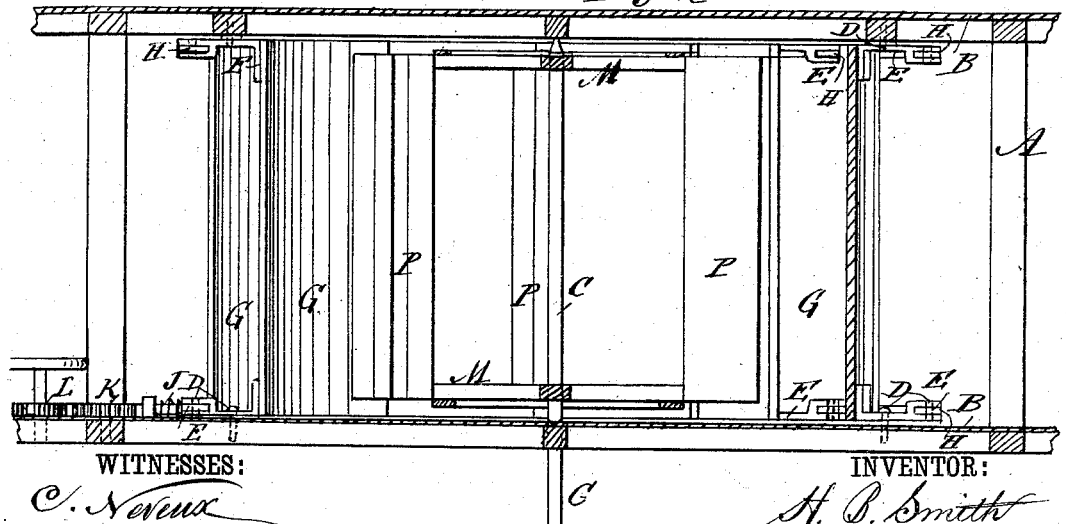
WITNESSES:
C. Neveux
C. Sedgwick
INVENTOR:
H. B. Smith
BY Munn & Co
ATTORNEYS.
N. PETERS, PHOTO-LITHOGRAPHER, WASHINGTON, D. C.

UNITED STATES PATENT OFFICE.

HILLIARD B. SMITH, OF STEPHENVILLE, TEXAS, ASSIGNOR TO HIMSELF AND AUGUSTIN M. BORDERS, OF SAME PLACE.

WIND-WHEEL.

SPECIFICATION forming part of Letters Patent No. 232,558, dated September 21, 1880.

Application filed June 17, 1880. (No model.)

*To all whom it may concern:*

Be it known that I, HILLIARD B. SMITH, of Stephenville, in the county of Erath and State of Texas, have invented a new and useful Improvement in Wind-Wheels, of which the following is a specification.

My invention consists in a novel arrangement and combination of wings or gates in a casing outside and independent of the wheel, whereby provision is made for adjusting the position of said wings, and consequently regulating the speed of the wheel, according to the force of the wind.

In the accompanying drawings, Figure 1 is a horizontal section of an apparatus embodying my improvements, and Fig. 2 is a vertical section of the same taken in the line $x\ x$ of Fig. 1.

Similar letters of reference indicate corresponding parts.

A represents the frame-work supporting the working parts of the apparatus. In the top and bottom of this frame-work are circular plates B B, in which is journaled the main shaft C, which carries the wind-wheel. Near the peripheries of the two plates B are rods D, which form the bearings for arms E, to the inner ends of which are attached vertical plates G, forming wings or gates. Each of these plates is curved in the form of an arc of a circle corresponding with the periphery of the plate B.

The outer ends of the arms E are connected to each other by rods or bars H, so that they will all move simultaneously. One of these arms has connected to it one end of a spring, J, the other end of which is so arranged with relation to the frame-work as to have a tendency to hold the gates G in the positions shown in Fig. 1, so as to allow the wind to have free access to the interior. The spring J is also connected with a rack-bar, K, engaging with a pinion, L, on a shaft worked by hand, so that the gates may be closed when desired.

The main shaft C is provided with radial arms M, to which the sails P are attached. These sails are arranged tangentially, so that as the wind enters the casing in the direction of the arrows it strikes one side of a sail, and as it leaves the casing it strikes the other side of another sail, and thus a uniform motion of the wheel is obtained.

When the force of the wind is too great it automatically closes the gates G, and when the force of the wind is relaxed the spring J opens them again.

Having thus described my invention, I claim as new and desire to secure by Letters Patent—

1. The combination and arrangement of the curved wings or gates G, the arms E, the connecting-bars H, and spring J, as shown and described, for the purpose specified.

2. The combination, with the gates G, arms E, bars H, and spring J, of the rack K and pinion L, as shown and described, for the purpose specified.

HILLIARD BONAPARTE SMITH.

Witnesses:
LEE YOUNG,
JOHN S. HYATT.